United States Patent
Düll et al.

(10) Patent No.: US 11,833,646 B2
(45) Date of Patent: Dec. 5, 2023

(54) MOUNTING SYSTEM FOR BOX PROFILE

(71) Applicant: ILLINOIS TOOL WORKS INC., Glenview, IL (US)

(72) Inventors: Florian Düll, Röttingen (DE); Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 294 days.

(21) Appl. No.: 17/274,954

(22) PCT Filed: Sep. 3, 2019

(86) PCT No.: PCT/US2019/049286
§ 371 (c)(1),
(2) Date: Mar. 10, 2021

(87) PCT Pub. No.: WO2020/055624
PCT Pub. Date: Mar. 19, 2020

(65) Prior Publication Data
US 2022/0032432 A1 Feb. 3, 2022

(30) Foreign Application Priority Data
Sep. 14, 2018 (EP) ..................................... 18194670

(51) Int. Cl.
*B25B 27/00* (2006.01)
*B25B 23/00* (2006.01)
(Continued)

(52) U.S. Cl.
CPC ...... *B25B 27/0035* (2013.01); *B25B 23/0085* (2013.01); *B25B 27/14* (2013.01); *F16B 5/02* (2013.01); *F16B 37/046* (2013.01)

(58) Field of Classification Search
CPC .......... F16B 37/046; F16B 5/02; F16B 45/00; F16B 21/086; B25B 27/14; B25B 27/0035; B25B 23/0085
See application file for complete search history.

(56) References Cited

U.S. PATENT DOCUMENTS

| 3,342,090 A | 9/1967 | Martin |
| 8,615,889 B2 * | 12/2013 | Martinsson ............... F16B 5/02 403/24 |

(Continued)

FOREIGN PATENT DOCUMENTS

| CN | 101821067 A * | 9/2010 | ............. B27B 17/02 |
| CN | 101821067 A | 9/2010 | |

(Continued)

OTHER PUBLICATIONS

Cabanac et al.; Tool for Installing a Fastening to Tighten in a Difficult-to-Access Area; Jan. 1, 2016; EPO English Machine Translation; pp. 1-5 (Year: 2023).*

PCT, International Search Report and Written Opinion, International Application No. PCT/US2019/049286; dated Nov. 19, 2019, 13 pages.

*Primary Examiner* — Bayan Salone
(74) *Attorney, Agent, or Firm* — THOMPSON HINE LLP

(57) ABSTRACT

Installation system for a box profile (100) for a motor vehicle, wherein the installation system (1) has: —at least one carrier strip (10), which can be pushed into the box profile (100), —at least one nut element (20) for prepositioning on the carrier strip (10), wherein the nut element (20) is designed to be prepositioned in a releasable manner on the carrier strip (10), and the installation system (1) has a positioning strip (30), which can be displaced relative to the carrier strip (10) and is designed to arrange the at least one nut element (20), in the state in which the latter has been prepositioned on the carrier strip (10), on an opening (102) of the box profile (100). Installation method. Nut element.

18 Claims, 2 Drawing Sheets

(51) Int. Cl.
    *B25B 27/14* (2006.01)
    *F16B 5/02* (2006.01)
    *F16B 37/04* (2006.01)

(56) References Cited

U.S. PATENT DOCUMENTS

| | | | |
|---|---|---|---|
| 8,740,529 B2* | 6/2014 | Martinsson | B27B 17/02 |
| | | | 411/134 |
| 9,273,708 B2* | 3/2016 | Urban | F24S 25/65 |
| 9,288,106 B2* | 3/2016 | Halpern | H04L 41/0803 |
| 9,409,441 B2* | 8/2016 | Mayer Pujadas | B60B 7/14 |
| 10,288,106 B2* | 5/2019 | Lemacks | F16B 37/044 |
| 10,399,528 B2* | 9/2019 | Yamamoto | F16B 21/086 |
| 2012/0308328 A1 | 12/2012 | Ueno | |
| 2017/0030396 A1* | 2/2017 | Miner | F16B 37/045 |

FOREIGN PATENT DOCUMENTS

| | | | | |
|---|---|---|---|---|
| CN | 104736859 A | | 6/2015 | |
| CN | 105102237 A | * | 11/2015 | B60B 3/165 |
| CN | 105102237 A | | 11/2015 | |
| CN | 106004768 A | | 10/2016 | |
| CN | 106369035 A | | 2/2017 | |
| CN | 113165149 A | * | 7/2021 | B25B 23/0085 |
| ES | 2444000 A1 | | 2/2014 | |
| FR | 3022816 A1 | * | 1/2016 | B25B 13/481 |
| FR | 3022816 A1 | | 1/2016 | |
| WO | WO 2013167766 A1 | | 11/2013 | |
| WO | WO 2018023154 A1 | | 2/2018 | |

* cited by examiner

MOUNTING SYSTEM FOR BOX PROFILE

TECHNICAL FIELD

The invention relates generally to installation systems which are intended for installing add-on parts on box profiles in the automotive sector, or for installing the box profile in the automobile, and in the case of which one or more nut elements are to be provided on an inner wall of the box profile.

BACKGROUND

The difficulty of the above-mentioned installation systems is that of positioning the nut elements precisely and straightforwardly on bores of the box profile so that screws for screw-connection to the nut elements can be guided through said bores.

A previous solution uses metal or plastic carrier strips, on which the nut elements are prepositioned. The carrier strip is pushed into the box profile and nut elements, together with the carrier strip, are then screw-connected.

Prior-art document WO 2013/167766 A1 discloses a nut element in the form of a clip-type nut which can be clipped laterally into a box profile, whereby the thread of the clip-type nut comes into abutment, perpendicularly to the side in which the clip-type nut has been clipped in, over a bore and can thus be screw-connected from the outside.

The inventors deemed it to be disadvantageous that, in the first example, the screwed-on carrier strip involves additional weight and there also tolerance problems resulting from the prepositioning of the nut elements on the strip. In the second example, although less weight is involved (in comparison with the metal or plastic strip being screwed on), it is necessary to have additional lateral openings in the box profile in order for the clip-type nuts to be clipped in, and said openings weaken the structure of the box profile.

SUMMARY

The invention has been based on the object of improving these disadvantages. This object is achieved by the invention in particular as it is defined in the independent claims.

In particular, this object is achieved by an installation system for a box profile for a motor vehicle, wherein the installation system has:
- at least one carrier strip, which can be pushed into the box profile,
- at least one nut element for prepositioning on the carrier strip, wherein the nut element is designed to be prepositioned in a releasable manner on the carrier strip, and the installation system has a positioning strip, which can be displaced relative to the carrier strip and is designed to arrange the at least one nut element, in the state in which the latter has been prepositioned on the carrier strip, on an opening of the box profile.

In particular, this object is also achieved by a method for installing an add-on part of a vehicle on a box profile, or for installing a box profile in the vehicle, containing the following steps:
- prepositioning at least one nut element on a carrier strip,
- introducing the carrier strip, with the nut element, into the box profile,
- installing the box profile, or installing on the box profile, by screw-connection of the nut element using a screw guided through an opening of the box profile;

wherein the method,
prior to installation, has the following step:
- arranging the nut element on the opening by means of the positioning strip;
and, following or prior to installation, but following the arrangement of the nut element on the opening, has the following step:
- guiding the positioning strip and the carrier strip out of the box profile and, in the process or prior to this operation, releasing the nut element from the carrier strip.

On the one hand, this improves the tolerance behavior since the releasable prepositioning of the nut element on the carrier strip allows orientation on the bore in the box profile to take place to better effect. On the other hand, the use of a positioning strip makes it possible to pull back both the positioning strip and the carrier strip out of the box profile again at the latest when screw-connection installation has taken place. This reduces weight without any need for lateral apertures as in WO 2013/167766 A1. The installation system preferably also has the box profile.

In the case of a further installation system according to the invention, provision is made for the nut element to be designed to be retained on the opening on an inner side of the box profile, preferably the side in which the opening is made, by means of a latching connection between the nut element and the box profile.

In a further installation method according to the invention, the nut element is latched by virtue of the positioning strip being displaced on an inner side of the box profile, preferably the side in which the opening is made.

This makes it possible for the carrier strip and the positioning strip to be removed from the profile even prior to the nut element being screw-connected, which provides for simplified installation and application cases in which the end openings in the profile are no longer accessible when the profile is being screw-connected.

This gives rise to a further, related solution to the object of the invention in the form of a preassembly method, and/or use of an installation system according to the invention having a nut element designed for prelatching purposes, for the preassembly of at least one nut element on an opening in a box profile for a vehicle, containing the following steps:
- prepositioning at least one nut element on a carrier strip,
- introducing the carrier strip, with the nut element, into the box profile;

wherein the following steps are carried out in addition:
- arranging the nut element on the opening by means of a positioning strip,
- latching the nut element to the box profile on an inner side of the box profile; and
- guiding the positioning strip and the carrier strip out of the box profile.

The nut element is preferably released from the carrier strip when the nut element is being arranged in position, release preferably taking place by virtue of the positioning strip being displaced in relation to the carrier strip in the longitudinal direction. The nut element is preferably latched when the nut element is being arranged in position, latching preferably taking place by virtue of the positioning strip being displaced in relation to the carrier strip in the longitudinal direction.

In the case of a further installation system according to the invention, provision is made for the nut element to have one or more latching hooks, which are designed to hook in behind a protrusion of the box profile and thus to retain the nut element on the opening.

In a further installation method or preassembly method according to the invention, the nut element is retained correspondingly.

This provides for a latching connection between the nut element and the box profile on the opening.

In the case of a further installation system according to the invention, provision is made for the nut element to be designed to be released from the carrier strip by virtue of the positioning strip being displaced in relation to the carrier strip.

In a further installation method or preassembly method according to the invention, the nut element is released correspondingly.

This can achieve more advantageous tolerance compensation.

In the case of a further installation system according to the invention, provision is made for the nut element to be designed to be prepositioned on the carrier strip via a recess, preferably a groove or slot, and a corresponding protrusion, preferably a tongue or nipple, by virtue of the recess and protrusion being fitted one inside the other, and therefore movement of the nut element in the longitudinal direction is restricted and movement in the direction of the opening when the carrier strip has been pushed into the box profile is possible.

In a further installation method or preassembly method according to the invention, the nut element is prepositioned correspondingly.

As a result, the nut element is suitably prepositioned on the carrier strip such that it can be released by the positioning strip.

It is preferable for the carrier strip to have the recess in the form of a slot which is oriented in the direction of the opening, and is open toward the latter, and for the nut element to have the protrusion in the form of a corresponding nipple, which is guided in the slot. It is preferable for at least two recesses and protrusions to be provided for retaining purposes for a nut element.

In the case of a further installation system according to the invention, provision is made for the nut element to have at least one centering element, by means of which it is possible to orient the nut element on the opening of the box profile.

In a further installation method or preassembly method according to the invention, the nut element is oriented correspondingly by virtue of the positioning strip being displaced.

This provides for precise orientation of each individual nut element independently of one another on the corresponding opening of the box profile.

The nut element preferably has two or more centering elements.

In the case of a further installation system according to the invention, provision is made for the centering element to be in the form of a stub, which is designed to penetrate into a centering recess located alongside the opening of the box profile, preferably in the same wall of the box profile.

In a further installation method or preassembly method according to the invention, the nut element is oriented correspondingly.

This achieves centering when the nut element is being arranged on the opening.

The stub preferably tapers in the direction of its tip.

In the case of a further installation system according to the invention, provision is made for the nut element to have a threaded part and a preassembly part.

This makes the nut part easier to produce. The preassembly part preferably has the at least one protrusion for prepositioning on the carrier strip and preferably the at least one latching hook for latching to the box profile and also preferably has the at least one centering element.

In the case of a further installation system according to the invention, provision is made for the threaded part to be produced from metal and for the preassembly part to be produced from plastic.

On the one hand, this makes it possible for the nut part to absorb high forces; on the other hand, the use of plastic reduces weight.

The threaded part is preferably encapsulated in injection molding by the preassembly part or the threaded part and the preassembly part are produced separately and then assembled.

In the case of a further installation system according to the invention, provision is made for the carrier strip to be a U-shaped profile strip or a box-like profile.

The recesses are preferably made on opposite side walls of the U-shaped profile or on one side of the box-like profile. The U-shaped profile is preferably open in the direction of the openings of the box profile.

In the case of a further installation system according to the invention, provision is made for the positioning strip to be guided in the carrier strip.

In a further installation method or preassembly method according to the invention, the positioning strip is guided correspondingly.

This results in an easy-to-handle configuration of the positioning strip.

The positioning strip preferably has a width which is slightly smaller than an inner width of the carrier strip.

In the case of a further installation system according to the invention, provision is made for the positioning strip to have at least one ramp, which is designed to come into contact behind the carrier strip, or behind the nut element prepositioned in the carrier strip, and to shift the carrier strip, or the nut element, in the direction of the opening by virtue of being displaced in relation to the carrier strip.

As a result, a displacement movement of the positioning strip is converted transversely into movement of the carrier strip or of the nut element, which makes it possible for the nut element to be pushed against the box profile or for the abovedescribed latching connection to be latched in.

In a further installation method or preassembly method according to the invention, the nut element is shifted correspondingly.

A ramp is understood according to the invention to be both a slanting plane and a curved plane—relative to the longitudinal direction in each case.

In the case of a further installation system according to the invention, provision is made for the positioning strip to have a plurality of ramps arranged at defined spacings (in the longitudinal direction) one behind the other.

In a further installation method or preassembly method according to the invention, use is made of a corresponding positioning strip.

This makes it possible for a plurality of nut elements to be arranged on the openings over a relatively short overall displacement movement.

In the case of a further installation system according to the invention, provision is made such that among the spacings are spacings which correspond to the spacings between the openings.

This makes it possible for a plurality of nut elements to be arranged on the openings at the same time over a relatively short overall displacement movement. In a further installation method or preassembly method according to the invention, a plurality of nut elements are arranged on the openings at the same time.

In the case of a further installation system according to the invention, provision is made such that among the spacings are spacings which differ from the spacings between the openings.

This makes it possible for a plurality of nut elements to be arranged on the openings one after the other over a relatively short overall displacement movement. In a further installation method or preassembly method according to the invention, a plurality of nut elements are arranged on the openings at correspondingly different times.

In particular, this object is also achieved by a nut element for an installation system according to the invention, wherein the nut element is configured as described in one or more of the preceding configurations.

The nut element preferably has one or more latching hooks, which are designed to hook in behind a protrusion of the box profile and thus to retain the nut element on the opening. The nut element preferably has a threaded part and a preassembly part, wherein preferably the threaded part is produced from metal and the preassembly part is produced from plastic. The nut element preferably has at least one centering element, by means of which it is possible to orient the nut element on the opening of the box profile, wherein preferably the centering element is in the form of a stub, which is designed to penetrate into a centering recess located alongside the opening of the box profile, preferably in the same wall of the box profile. The nut element preferably has a protrusion in the form of a nipple for guiding in the slot of the carrier strip. It is preferable for at least two protrusions to be provided for retaining purposes for a nut element.

BRIEF DESCRIPTION OF THE DRAWINGS

The invention will now be demonstrated further, by way of example, with reference to drawings, in which.

A more detailed description of FIGS. 1A-1C follows hereinbelow.

DETAILED DESCRIPTION

Figure 1A:
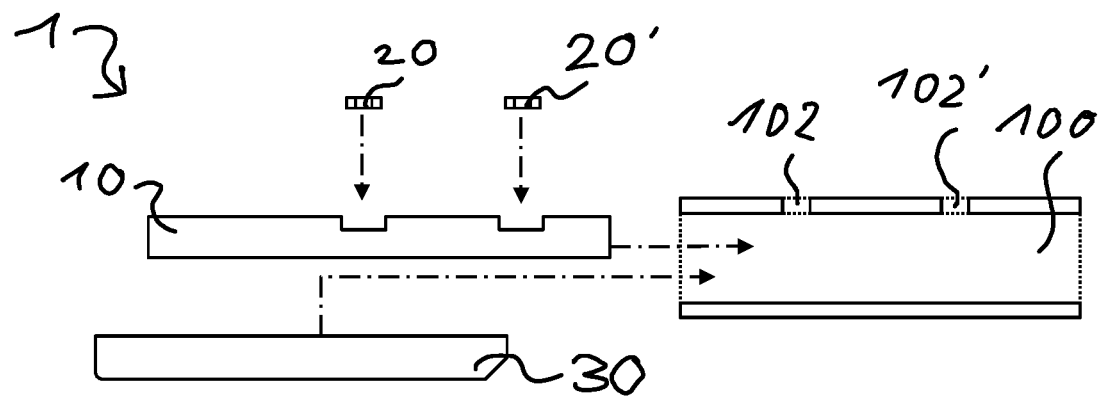
FIGS. 1A-1C show a first embodiment of an installation system according to the invention.
Figure 1B:
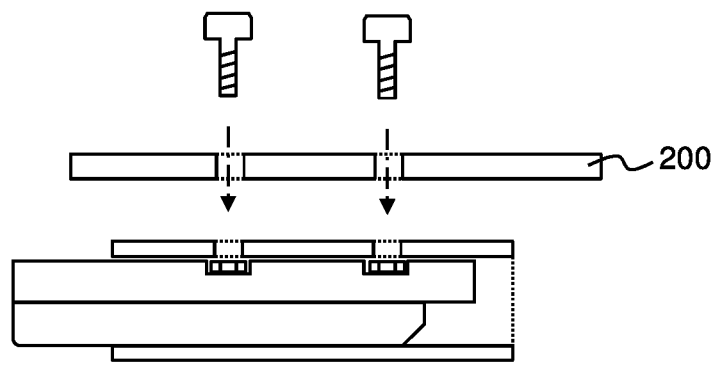
Figure 1C:
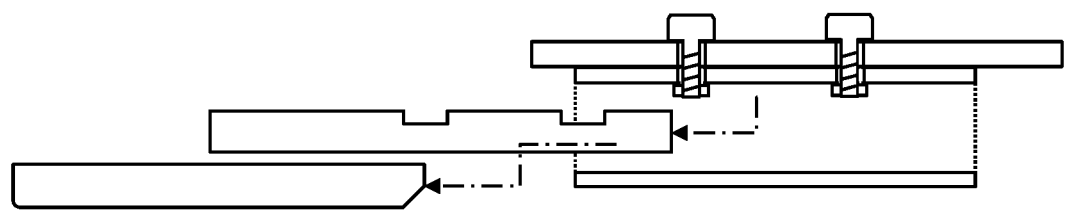

FIG. 1A shows the initial state, FIG. 1B shows the state with nut elements 20, 20' arranged by the positioning strip, and FIG. 1C shows the definitively installed state on a vehicle component 200. The configuration is such that the installation system 1 has:
  a carrier strip 10, which can be pushed into the box profile 100,
  two nut elements 20, 20' for prepositioning on the carrier strip 10,
wherein the nut elements 20, 20' are designed to be prepositioned in a releasable manner on the carrier strip 10, and wherein the installation system 1 has a positioning strip 30, which can be displaced relative to the carrier strip 10 and is designed to arrange the nut elements 20, 20', in the state in which the latter have been prepositioned on the carrier strip 10, on a respective opening 102, 102' of the box profile 100.

Installation contains the following steps:
  prepositioning the nut elements 20, 20' on the carrier strip 10,
  introducing the carrier strip 10, with the nut elements 20, 20, into the box profile 100,
  installing the vehicle component 200 on the box profile 100 by screw-connection of the nut elements 20, 20' using a respective screw guided through a respective opening 102, 102' of the box profile 100;
wherein the method,
prior to installation, has the following step:
  arranging the nut elements 20, 20' on the openings 102, 102' by means of the positioning strip 30;
and, following or prior to installation, but following the arrangement of the nut elements 20, 20', has the following step:
  guiding the positioning strip 30 and the carrier strip 10 (separate guidance in this example) out of the box profile 100 and, in the process, releasing the nut elements 20, 20' from the carrier strip 10.

Figure 2A:
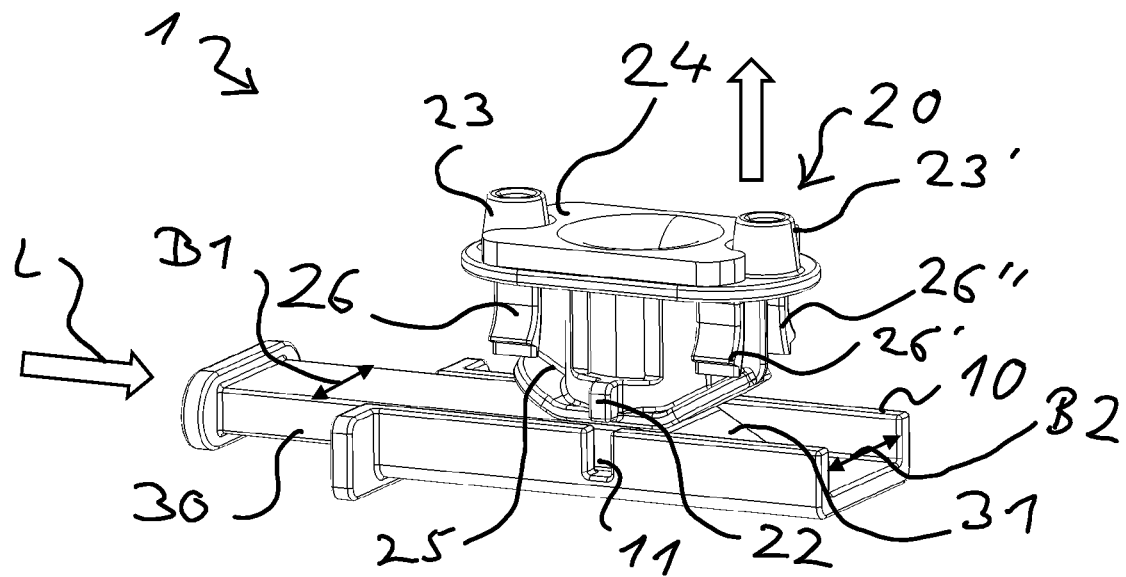
FIGS. 2A-2B show, on the basis of the first embodiment, a second embodiment of an installation system according to the invention.
Figure 2B:
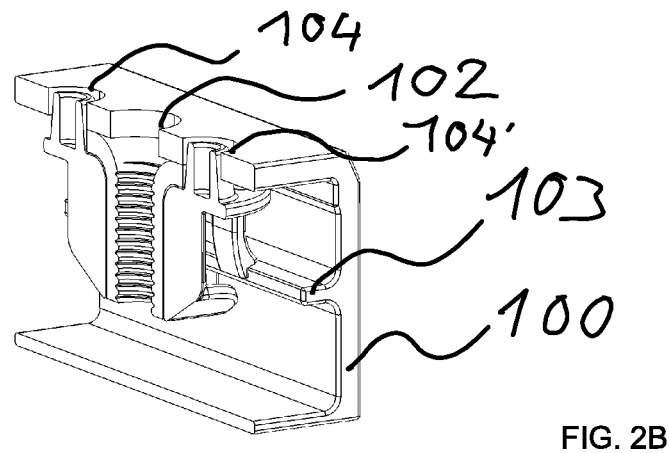

A more detailed description of FIGS. 2A-2B follows hereinbelow. FIG. 2A shows the nut element 20 in the state in which it has been pushed upward by the positioning strip 30 and detached from the carrier strip 10—to improve clarity, the nut element is shown without the box profile 100, although said pushing-upward action takes place within the box profile 100. Also for reasons of clarity, there are no other nut elements 20' illustrated, although this installation system has five nut elements. The following description also applies to the other four nut elements (not shown). FIG. 2B shows the nut element in the state in which it has been latched on the box profile 100. In contrast to the configuration in FIGS. 1A-1C, the nut element 20 in this configuration has already been released from the carrier strip by virtue of the nut element 20 being arranged on the opening 102 by means of the positioning strip 30. The configuration is such that the nut element 20 is designed to be retained on the opening 102 on the inner side of the side of the box profile 100 in which the opening 102 is made, by means of a latching connection between the nut element 20 and the box profile 100. The configuration is such that the nut element 20 has four latching hooks 26, 26', 26''' (fourth latching hook concealed), which are designed to hook in behind a total of two protrusions 103 (second protrusion not shown in FIG. 2B, but is located in a corresponding position, mirrored along section planes, opposite the protrusion 103) of the box profile 100 and thus to retain the nut element 20 on the opening 102. The configuration is such that the nut element 20 is designed to be released from the carrier strip 10 by virtue of the positioning strip 30 being displaced in relation to the carrier strip 10. The configuration is such that the nut element 20 is designed to be prepositioned on the carrier strip via a recess 11, in this case a slot, and a corresponding protrusion 22, in this example a nipple, by virtue of the recess 11 and protrusion 22 being fitted one inside the other, and therefore movement of the nut element 20 in the longitudinal direction L is restricted and movement in the direction of the opening 102 when the carrier strip 10 has been pushed into the box profile 100 is possible. In this example, the carrier strip 10 has the recess 11 in the form of a slot which is oriented in the direction of the opening 102, and is open toward the latter, and the nut element 20 has the protrusion 22 in the form of a corresponding nipple, which is guided in the slot. In this example, two recesses 11 and protrusions 22 are provided for retaining purposes for a nut element 20 (concealed on the rear side in FIG. 2A). The configuration is such that the nut element 20 has two centering elements 23, 23', by means of which it is possible to orient the nut element 20 on the opening 102 of the box profile 100. The configuration is such that the centering elements 23, 23' are in the form of stubs, which are designed to penetrate into centering recesses 104, 104' located alongside the opening 102 of the box profile 100, in this example in the same wall of the box profile 100. In this example, the stub tapers in the direction of its tip. The configuration is such that the nut element 20 has a threaded part 24 and a preassembly part 25. The preassembly part 25 has the two protrusions 22 for prepositioning on the carrier strip 10 and the four latching hooks 26, 26'', 26''' for latching to the box profile 100 and also has the centering elements 23, 23'. The configuration is such that the threaded part 24 is produced from metal and the preassembly part 25 is produced from plastic. In this example, the threaded part 24 and preassembly part 25 are produced separately and then assembled. The configuration is such that the carrier strip 10 is a U-shaped profile strip. In this example, the recesses 11 are made on opposite side walls of the U-shaped profile. In this example, the U-shaped profile is open in the direction of the openings 102 of the box profile 100. The configuration is such that the positioning strip 30 is guided in the carrier strip 10. In this example, the positioning strip has a width B1 which is slightly smaller than an inner width B2 of the carrier strip. The configuration is such that the positioning strip 30 has at least one ramp 31, which is designed to come into contact behind the nut element 20 prepositioned in the carrier strip 10 and to shift the nut element 20 in the direction of the opening 102 by virtue of being displaced in relation to the carrier strip 10.

In this example, the nut elements 20 are preassembled on the openings 102 via a preassembly method, containing the following steps:

prepositioning the nut elements 20 on a carrier strip 10,
introducing the carrier strip 10, with the nut elements 20, into the box profile 100,
releasing the nut elements 20 from the carrier strip 10 and arranging the nut elements 20 on the opening, and also latching the nut elements 20 to the box profile 100 on the inner side of the box profile 100, by means of the positioning strip 30 by virtue of the positioning strip 30 being displaced in the longitudinal direction relative to the carrier strip;
guiding the positioning strip 30 and the carrier strip 10 out of the box profile 100.

Since the nut elements 20 were released from the carrier strip 10 by the positioning strip 30, it is possible for the positioning strip 30 and the carrier strip 10 to be guided together out of the box profile 100.

Figure 3:
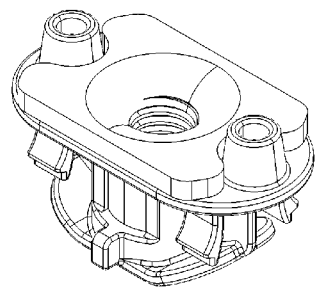
FIG. 3 shows a nut element according to the invention.

A more detailed description of FIG. 3 follows hereinbelow. The configuration is such that the nut element 20 is configured as in FIGS. 2A-2B. The nut element 20 has four latching hooks 26, 26', 26''', which are designed to hook in behind a protrusion 103 of the box profile 100 and thus to retain the nut element 20 on the opening 102. In this example, the nut element 20 has a threaded part 24 and a preassembly part 25, wherein the threaded part 24 is produced from metal and the preassembly part 25 is produced from plastic. In this example, the nut element 20 has at least two centering elements 23, 23', by means of which it is possible to orient the nut element 20 on the opening 102 of the box profile 100, wherein the centering elements 23, 23' here are in the form of stubs, which are designed to penetrate into a respective centering recess 104 located alongside the opening 102 of the box profile 100, in this example in the same wall of the box profile 100. The nut element 20 has a protrusion 22 in the form of a nipple for guiding in the slot of the carrier strip 10. In this example, at least two protrusions 22 are provided for retaining purposes for a nut element 20. The preassembly part 25 has the two protrusions 22 for prepositioning on the carrier strip 10 and the four latching hooks 26, 26'', 26''' for latching to the box profile 100 and also has the centering elements 23, 23'.

| List of Reference Signs | |
|---|---|
| 1 | Installation system |
| 10 | Carrier strip |
| 11 | Recess |
| 20 | Nut element |
| 22 | Protrusion |
| 23 | Centering element |
| 24 | Threaded part |
| 25 | Preassembly part |
| 26 | Latching hook |
| 30 | Positioning strip |
| 31 | Ramp |
| 100 | Box profile |
| 102 | Opening |
| 103 | Protrusion |
| 104 | Centering recess |
| 200 | Vehicle component |
| B1 | Width |
| B2 | Inner width |
| L | Longitudinal direction |

The invention claimed is:

1. An installation system for a box profile for a motor vehicle, wherein the installation system has:
at least one carrier strip, which can be pushed into the box profile,
at least one nut element for prepositioning on the carrier strip,
wherein
the nut element is configured to be prepositioned in a releasable manner on the carrier strip, and
the installation system has a positioning strip, which can be displaced relative to the carrier strip and is designed to arrange the at least one nut element, when the nut element is prepositioned on the carrier strip, on an opening of the box profile.

2. The installation system as claimed in claim 1, wherein the nut element is configured to be retained on the opening on an inner side of the box profile by a latching connection between the nut element and the box profile.

3. The installation system as claimed in claim 2, wherein the nut element has one or more latching hooks, which are configured to hook in behind a protrusion of the box profile and thus to retain the nut element on the opening.

4. The installation system as claimed in claim 1, wherein the nut element is configured to be released from the carrier strip by virtue of the positioning strip being displaced in relation to the carrier strip.

5. The installation system as claimed in claim 1, wherein the nut element is configured to be prepositioned on the carrier strip via a recess and a corresponding protrusion, by virtue of the recess and protrusion being fitted one inside the other, and therefore movement of the nut element in a longitudinal direction is restricted and movement in the direction of the opening when the carrier strip has been pushed into the box profile is possible.

6. The installation system as claimed in claim 1, wherein the nut element has at least one centering element, by means of which it is possible to orient the nut element on the opening of the box profile.

7. The installation system as claimed in claim 6, wherein the centering element is in the form of a stub, which is configured to penetrate into a centering recess alongside the opening of the box profile.

8. The installation system as claimed in claim 1, wherein the nut element has a threaded part and a preassembly part.

9. The installation system as claimed in claim 8, wherein the threaded part is produced from metal and the preassembly part is produced from plastic.

10. The installation system as claimed in claim 1, wherein the carrier strip is a U-shaped profile strip or a box-like profile.

11. The installation system as claimed in claim 10, wherein the positioning strip is guided in the carrier strip.

12. The installation system as claimed in claim 1, wherein the positioning strip has at least one ramp, which is configured to come into contact behind the carrier strip, or behind the nut element prepositioned in the carrier strip, and to shift the carrier strip, or the nut element, in the direction of the opening by virtue of being displaced in relation to the carrier strip.

13. The installation system as claimed in claim 12, wherein the positioning strip has a plurality of ramps arranged at defined spacings one behind the other.

14. The installation system as claimed in claim 13, wherein among the spacings are spacings which correspond to the spacings between the openings.

15. The installation system as claimed in claim 14, wherein among the spacings are spacings which differ from the spacings between the openings.

16. A method for installing an add-on part of a vehicle on a box profile, or for installing a box profile in a vehicle, containing the following steps:

prepositioning at least one nut element on a carrier strip,
introducing the carrier strip, with the nut element, into the box profile,
installing the add-on part of the vehicle on the box profile, or installing the box profile in the vehicle, by screw-connection of the nut element using a screw guided through an opening of the box profile;
wherein the method,
prior to installation, has the following step:
arranging the nut element on the opening by means of a positioning strip;
and, following or prior to installation, but following the arrangement of the nut element on the opening, has the following step:
guiding the positioning strip and the carrier strip out of the box profile and, in the process or prior to this operation, releasing the nut element from the carrier strip.

17. A method for the preassembly of at least one nut element on an opening in a box profile for a vehicle, containing the following steps:
prepositioning at least one nut element on a carrier strip,
introducing the carrier strip, with the nut element, into the box profile,
wherein the method has the following steps:
arranging the nut element on the opening by means of a positioning strip,
latching the nut element to the box profile on an inner side of the box profile, and
guiding the positioning strip and the carrier strip out of the box profile.

18. The installation system of claim 1, wherein the positioning strip abuts the carrier strip within the box profile and the positioning strip is displaceable relative to the carrier strip along a longitudinal direction of the box profile.

* * * * *